(12) United States Patent
Yamamichi et al.

(10) Patent No.: US 12,310,544 B2
(45) Date of Patent: May 27, 2025

(54) CLEANING SHEET AND SURFACE SHEET FOR CLEANING SHEET

(71) Applicant: UNICHARM CORPORATION, Ehime (JP)

(72) Inventors: Ayuka Yamamichi, Kagawa (JP); Tomokazu Suda, Kagawa (JP); Yuuka Manabe, Kagawa (JP)

(73) Assignee: Unicharm Corporation, Ehime (JP)

( * ) Notice: Subject to any disclaimer, the term of this patent is extended or adjusted under 35 U.S.C. 154(b) by 1147 days.

(21) Appl. No.: 17/122,640

(22) Filed: Dec. 15, 2020

(65) Prior Publication Data

US 2021/0100421 A1 Apr. 8, 2021

Related U.S. Application Data

(63) Continuation of application No. PCT/JP2019/023759, filed on Jun. 14, 2019.

(30) Foreign Application Priority Data

Jun. 15, 2018 (JP) ................................. 2018-114968

(51) Int. Cl.
*A47L 13/17* (2006.01)
*D04H 3/04* (2012.01)
*A47L 13/44* (2006.01)

(52) U.S. Cl.
CPC ................ *A47L 13/17* (2013.01); *D04H 3/04* (2013.01); *A47L 13/44* (2013.01)

(58) Field of Classification Search
CPC .......... A47L 13/17; A47L 13/38; A47L 13/19; A47L 13/46; A47L 13/44; A47L 13/24;
(Continued)

(56) References Cited

U.S. PATENT DOCUMENTS

| 2005/0268417 A1 | 12/2005 | Tanaka |
| 2008/0166520 A1* | 7/2008 | Zafiroglu ............... D04B 35/06 428/136 |

(Continued)

FOREIGN PATENT DOCUMENTS

| CN | 1704012 A | 12/2005 |
| CN | 101711660 A | 5/2010 |

(Continued)

OTHER PUBLICATIONS

International Search Report issued in corresponding International Application No. PCT/JP2019/023759, mailed Jul. 16, 2019, with translation (3 pages).

(Continued)

*Primary Examiner* — Katina N. Henson
(74) *Attorney, Agent, or Firm* — Osha Bergman Watanabe & Burton LLP

(57) ABSTRACT

A cleaning sheet has a first direction, a second direction, and a thickness direction that are orthogonal to each other. The cleaning sheet includes: a water retention sheet that retains a chemical solution; a surface sheet that is a nonwoven fabric; and a cleaning region. The surface sheet includes: a first surface on a side of a surface to be cleaned; and a second surface on a side of the water retention sheet. The surface sheet includes, in the cleaning region, a plurality of flap portions. Each of the plurality of flap portions includes: one end; another end; a fixed end portion that connects the one end and the another end; and a free end portion that protrudes from the one end and the another end as starting points toward a direction away from the fixed end portion.

8 Claims, 10 Drawing Sheets

(58) Field of Classification Search
CPC .......... A47L 13/20; A47L 13/12; A47L 13/10; A47L 13/16; B32B 5/24; B32B 5/22; B32B 5/14; B32B 5/142; B32B 2432/00; B32B 5/26; B32B 5/12; B32B 5/022; B65H 35/04; D04H 3/04
See application file for complete search history.

(56) References Cited

U.S. PATENT DOCUMENTS

| | | | |
|---|---|---|---|
| 2014/0366293 A1* | 12/2014 | Roe | B32B 3/02 15/104.93 |
| 2020/0093349 A1* | 3/2020 | Hung-Chuan | A47L 13/17 |

FOREIGN PATENT DOCUMENTS

| | | |
|---|---|---|
| JP | 2002238821 A | 8/2002 |
| JP | 3140483 U | 3/2008 |
| JP | 2013027682 A | 2/2013 |

OTHER PUBLICATIONS

Written Opinion issued in corresponding International Application No. PCT/JP2019/023759, mailed Jul. 16, 2019 (3 pages).

* cited by examiner

CLEANING SHEET AND SURFACE SHEET FOR CLEANING SHEET

BACKGROUND

Technical Field

The present disclosure relates to a cleaning sheet, and a surface sheet for the cleaning sheet.

Related Art

A cleaning sheet for cleaning dust and garbage, which are present on a surface to be cleaned is known, and various improvements have been made from the viewpoint of improving the cleanability.

For example, in Patent Literature 1, a cleaning sheet is disclosed which is configured by a sheet structure body that forms a cleaning portion, wherein the sheet structure body includes a sheet material in which a plurality of slit holes are formed by providing slit groups which are formed by a number of slits with a predetermined pattern in the sheet raw material, stretching the sheet raw material in the direction which crosses with the thickness direction of the sheet raw material, and widening the plurality of slits which configure at least a portion of the slit group, and wherein in the cleaning portion, at least a portion of the slit holes in the sheet material is positioned.

Patent Literature 1 relates to a so-called dry type cleaning sheet, and does not relate to a wet type cleaning sheet, that is, a cleaning sheet which includes a water retention sheet that retains a chemical solution.

PATENT LITERATURE

Patent Literature 1: Japanese Unexamined Patent Publication No. 2013-27682

The cleaning sheet described in Patent Literature 1 is a dry type cleaning sheet, in the first place, and in the cleaning sheet described in Patent Literature 1, the slit group is provided for the purpose of stretching the cleaning sheet in the direction which crosses with the thickness direction thereof, and the slit group does not directly contribute to the cleanability of the cleaning sheet.

SUMMARY

One or more embodiments provide a cleaning sheet which can take in small garbage, can entangle large garbage, and can easily remove dirt.

According to one or more embodiments, a cleaning sheet includes a surface sheet and a water retention sheet which retains a chemical solution, and further includes a first direction, a second direction, and a thickness direction which are orthogonal to each other, and a cleaning region. The surface sheet is configured by a nonwoven fabric, and includes a first surface on a side of a surface to be cleaned and a second surface on a water retention sheet side, and the surface sheet includes in the cleaning region a plurality of flap portions each of which configured by including one end, the other end, a fixed end portion which connects the one end and the other end, and a free end portion which protrudes from the one end and the other end as starting points toward a direction away from the fixed end portion.

The cleaning sheet according to one or more embodiments can take in small garbage, can entangle large garbage, and can easily remove dirt.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

Definitions

The "Area" of the Flap Portion

In one or more embodiments, the area of the flap portion means the area in which the compartment that is defined by the free end portion and the fixed end portion that configure the flap portion is measured in the thickness direction of the cleaning sheet.

The "Movable Region" of the Flap Portion

In one or more embodiments, the movable region of the flap portion means the maximum region in which the flap portion may be present when the flap portion is folded back at any position once or a plurality of times so as to be in contact with the remaining portion of the surface sheet.

Figure 9:
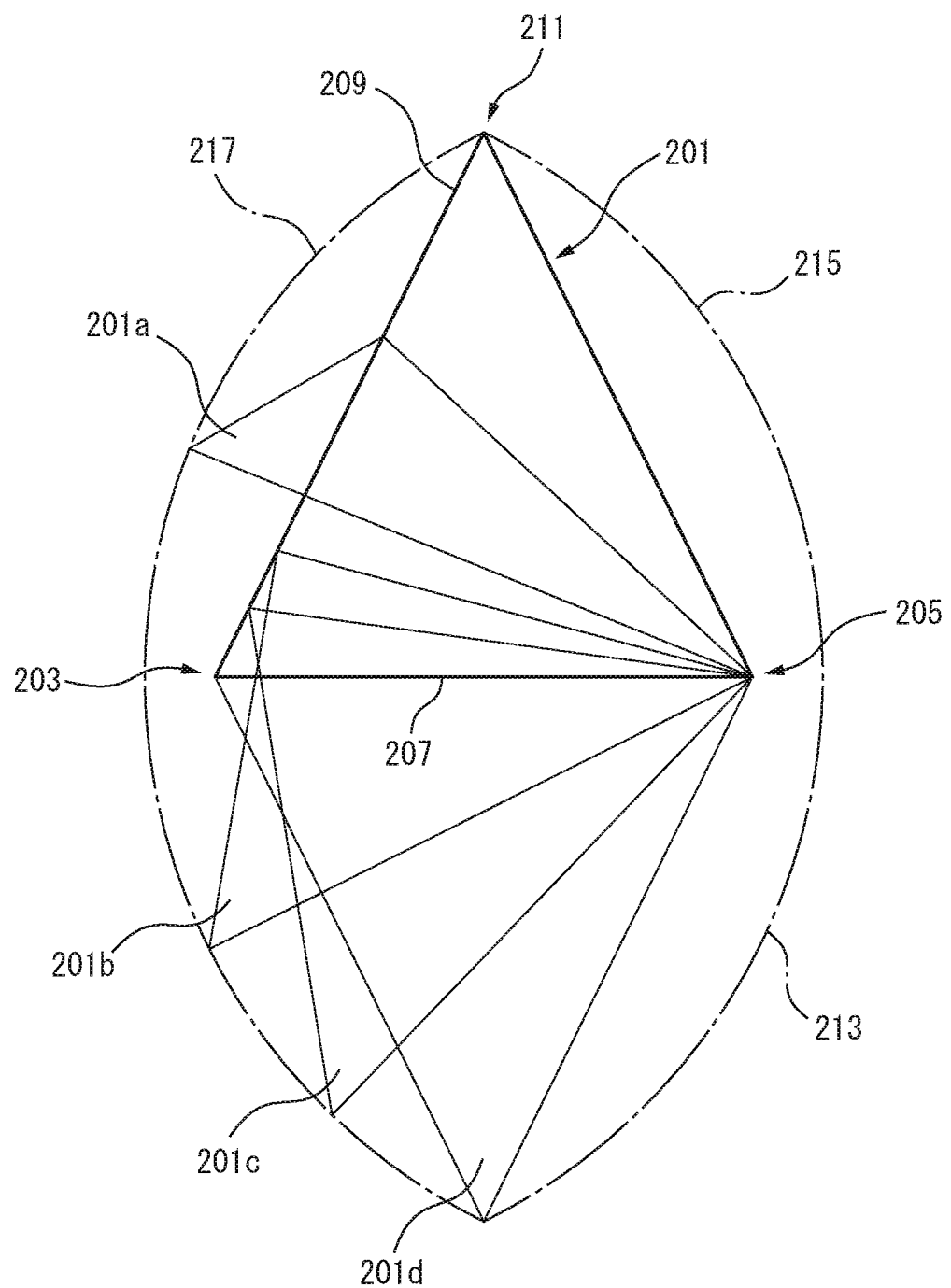
FIG. 9 is a diagram for explaining a movable region of the flap portion.

FIG. 9 is a view so as to explain the movable region of the flap portion, and the flap portion 201 is configured by including the one end 203 and the other end 205; the fixed end portion 207 which linearly connects the one end 203 and the other end 205; and the free end portion 209 which protrudes from the one end 203 and the other end 205 as starting points toward the direction away from the fixed end portion 207, and the free end portion 209 is configured by the linear portion which passes the one end 203 and the farthest portion 211, and the linear portion which passes the other end 205 and the farthest portion 211.

FIG. 9 also shows the flap portion 201a, the flap portion 201b, the flap portion 201c, and the flap portion 201d (the case in which the flap portion 201 is folded back at the fixed end portion 207), when the flap portion 201 is folded back once at different positions, and the movable region 213 is partitioned into the circular arc 215 with the one end 203 as the center and the linear portion which passes the one end 203 and the farthest portion 211 as the radius, and the circular arc 217 with the other end 205 as the center and the linear portion which passes the other end 205 and the farthest portion 211 as the radius.

In a case the flap portion is the flap portion 301 which includes the free end portion 309 configured by a semi-circular arc portion as shown in FIG. 10(*a*), the movable region of the flap portion 301 is partitioned by the free end portion 309 of the flap portion 301, and the free end portion 309 when the flap portion 301 is folded back at the fixed end portion 307.

The same can be said for the movable region in a case in which the flap portion is a flap portion which includes a free end portion configured by a circular arc portion that is smaller than a semi-circular arc portion.

To be specific, the present disclosure relates to the following aspects.

[Aspect 1]

A cleaning sheet which includes a surface sheet and a water retention sheet which retains a chemical solution, and further includes a first direction, a second direction, and a thickness direction which are orthogonal to each other, and a cleaning region, wherein the surface sheet is configured by a nonwoven fabric, and includes a first surface on a side of a surface to be cleaned and a second surface on a water retention sheet side, and the surface sheet includes in the cleaning region a plurality of flap portions each of which configured by including one end, the other end, a fixed end portion which connects the one end and the other end, and a free end portion which protrudes from the one end and the other end as starting points toward a direction away from the fixed end portion.

The above-mentioned cleaning sheet includes in the surface sheet, a plurality of flap portions that have a predetermined configuration. Accordingly, when the above-mentioned cleaning sheet is fixed to a cleaning tool so that the surface sheet comes into contact with the surface to be cleaned and the surface to be cleaned is cleaned (hereinbelow, "fixing the cleaning sheet to a cleaning tool so that the surface sheet comes into contact with the surface to be cleaned and cleaning the surface to be cleaned" may be simply referred to as "using the cleaning sheet", and when the flap portions which are present in the surface sheet come into contact with the portion with a high friction of the surface to be cleaned (for example, a portion where garbage, dirt, etc., are present), the above-mentioned flap portions are folded back in the direction from the free end portion toward the fixed end portion with the first surface on the inner side (hereinbelow, "the flap portions being folded back in the direction from the free end portion toward the fixed end portion with the first surface on the inner side" may be simply referred to as "the flap portions being folded back"), and as a result, the water retention sheet can apply the retaining chemical solution to the dirt portion without through the surface sheet, can wet the dirt portion, and can make it easier for the dirt to be removed (hereinbelow, which may be referred to as "the dirt portion wetting action").

Further, by the flap portion being folded back, an opening portion is formed at the position in which the flap portions are present in the surface sheet, and small garbage can be taken in from the opening portion (especially, around the fixed end portion) to the inside of the cleaning sheet (between the surface sheet and the water retention sheet) (hereinbelow, the action of the flap portions taking in small garbage from the opening portion to the inside of the cleaning sheet may be referred to as "the small garbage taking in action").

Still further, when the flap portions perform the reciprocating motion of being folded back and returning back, the flap portions can entangle large garbage (hereinbelow, the flap portions entangling large garbage by performing the reciprocating motion may be referred to as "the large garbage entangling action").

Still further, when using the cleaning sheet, there is a tendency that garbage such as hair, dust, etc., present on the surface to be cleaned is first caught by the cleaning sheet at the peripheral portion of the cleaning sheet, and garbage which is not caught by the cleaning sheet at the peripheral portion moves to the center portion of the cleaning sheet. Accordingly, in accordance with the usage of the cleaning sheet, at the peripheral portion of the cleaning sheet, the caught garbage such as hair, dust, etc., and garbage such as hair, dust, etc., which is present on the surface to be cleaned are connected so as to form a rod-shaped garbage connected body, and there is a tendency that as the amount of garbage which the cleaning sheet catches increases, the garbage connected body becomes larger. When the above-mentioned flap portions perform the reciprocating motion, by the flap portions involving the garbage connected body, etc., the flap portions can keep retaining the garbage connected body (hereinbelow, the action of the flap portions keep retaining the garbage connected body, when performing the reciprocating motion may be referred to as "the garbage connected body retaining action").

Still further, by the flap portions being folded back, the cleaning sheet is to include a protruded and recessed region that includes a protruded region which is a region overlapping with the folded flap portions in the thickness direction, and a recessed region which is a region overlapping with the opening portion in the thickness direction, whereby the wipeability of dirt (for example, solid sebum dirt) by the cleaning sheet is improved (hereinblow, forming the protruded and recessed region by the flap portions being folded back, and wiping dirt may be referred to as "the dirt wiping action").

As described above, the above-mentioned cleaning sheet can take in small garbage, can entangle large garbage, and can easily remove dirt.

[Aspect 2]

The cleaning sheet according to aspect 1, wherein the surface sheet includes in the first direction and/or the second direction, as the plurality of flap portions, a flap portion which is disposed on an inner side and has a relatively small area ("first area"), and a flap portion which is disposed on an outer side and has a relatively large area ("second area").

In the above-mentioned cleaning sheet, when the flap portions with a relatively large area which are disposed on the outer side in the first direction and/or the second direction perform a relatively large reciprocating motion, it is easier for the flap portions to retain the enlarged garbage connected body by involving the garbage connected body, etc. Further, the flap portions with a relatively small area which are disposed on the inner side perform a relatively small reciprocating motion, and can catch the garbage left by the flap portions with a large area which are disposed on the outer side.

[Aspect 3]

The cleaning sheet according to aspect 1 or 2, wherein each of the plurality of flap portions includes, when folded back at any position, a movable region which is a maximum region in which the each of the plurality of flap portions can be present, and the surface sheet includes as the plurality of flap portions, flap portions in which the movable regions of two adjacent flap portions overlapping with each other in the thickness direction.

In the above-mentioned cleaning sheet, the surface sheet includes the predetermined flap portions, whereby when using the cleaning sheet, by the predetermined flap portions interfering with each other, the same can move in a complicated manner, and the above-mentioned small garbage taking in action, the large garbage entangling action, the garbage connected body retaining action, and the dirt wiping action can be exhibited in a greater degree.

[Aspect 4]

The cleaning sheet according to any one of aspects 1 to 3, wherein
the surface sheet includes as the plurality of flap portions, two adjacent flap portions which overlap with each other in the thickness direction.

In the above-mentioned cleaning sheet, the surface sheet includes the predetermined flap portions, whereby when using the cleaning sheet, by the predetermined flap portions interfering with each other, the same can move in a complicated manner, and the above-mentioned small garbage taking in action, the large garbage entangling action, the garbage connected body retaining action, and the dirt wiping action can be exhibited in a greater degree.

[Aspect 5]

The cleaning sheet according to any one of aspects 1 to 4, wherein
the surface sheet includes as the plurality of flap portions, two adjacent flap portions in which the free end portions do not cross with each other and the fixed end portions cross with each other.

In the above-mentioned cleaning sheet, the surface sheet includes the predetermined flap portions, whereby when using the cleaning sheet, by the predetermined flap portions interfering with each other, while retaining the degree of freedom of the free end portion which is to be the starting point when performing the reciprocating motion, the same can move in a complicated manner, and the above-mentioned small garbage taking in action, the large garbage entangling action, the garbage connected body retaining action, and the dirt wiping action can be exhibited in a greater degree.

[Aspect 6]

The cleaning sheet according to any one of aspects 1 to 5, wherein
the surface sheet includes as the plurality of flap portions, one direction flap portion which includes the free end portion which protrudes toward one direction of the first direction, and the other direction flap portion which includes the free end portion which protrudes toward the other direction of the first direction.

In the above-mentioned cleaning sheet, the surface sheet includes the predetermined first flap portion and the predetermined second flap portion as the plurality of flap portions, whereby when the cleaning sheet is made to reciprocate in the first direction, the above-mentioned small garbage taking in action, the large garbage entangling action, the garbage connected body retaining action, and the dirt wiping action can be exhibited when moved in either direction.

[Aspect 7]

The cleaning sheet according to any one of aspects 1 to 6, wherein
the surface sheet includes a first layer which configures the first surface, and includes a hydrophilic fiber and a hydrophobic fiber, and a second layer which configures the second surface, and includes a hydrophilic fiber and a hydrophobic fiber, and
a ratio of the hydrophobic fiber which configures the second layer is higher than a ratio of the hydrophobic fiber which configures the first layer.

In the above-mentioned cleaning sheet, each of the first layer and second layer has the predetermined hydrophobic fiber ratio. Accordingly, the first layer has a relatively higher ability to expand the chemical solution which the water retention sheet retains in the surface to be cleaned, and since the second layer has a higher hydrophobic fiber ratio than the first layer, the second layer has a relatively superior scraping property of the dirt portion. Further, it is difficult for the second layer with the higher hydrophobic fiber ratio to be adhered to the water retention sheet, whereby it is easier for the plurality of flap portions to be folded back when using the cleaning sheet.

In the above-mentioned cleaning sheet, when the surface to be cleaned is clean, the first layer of the surface sheet expands the chemical solution to the surface to be cleaned, so that the surface to be cleaned can be cleaner. Further, in a case in which the surface to be cleaned includes a portion with a high friction where garbage, dirt, etc., are present, the plurality of flap portions is folded back, the second layer which includes the hydrophobic fiber with a high ratio comes into contact with the wet dirt portion, scrapes the dirt portion, and can remove the dirt.

[Aspect 8]

A surface sheet for a cleaning sheet which includes the surface sheet which configures a cleaning surface, and a water retention sheet which retains a chemical solution, and further includes a first direction, a second direction, and a thickness direction which are orthogonal to each other, and a cleaning region, wherein
the surface sheet is configured by a nonwoven fabric, and includes a first surface which configures the cleaning surface, and a second surface on an opposite side of the first surface, and
the surface sheet includes in the cleaning region a plurality of flap portions each of which configured by including one end, the other end, a fixed end portion which connects the one end and the other end, and a free end portion which protrudes from the one end and the other end as starting points toward a direction away from the fixed end portion.

The above-mentioned surface sheet can take in small garbage, can entangle large garbage, and can easily remove dirt, when being used for the cleaning sheet.

Hereinbelow, the cleaning sheet, and the surface sheet for the cleaning sheet according to one or more embodiments are explained in detail.

Figure 1:
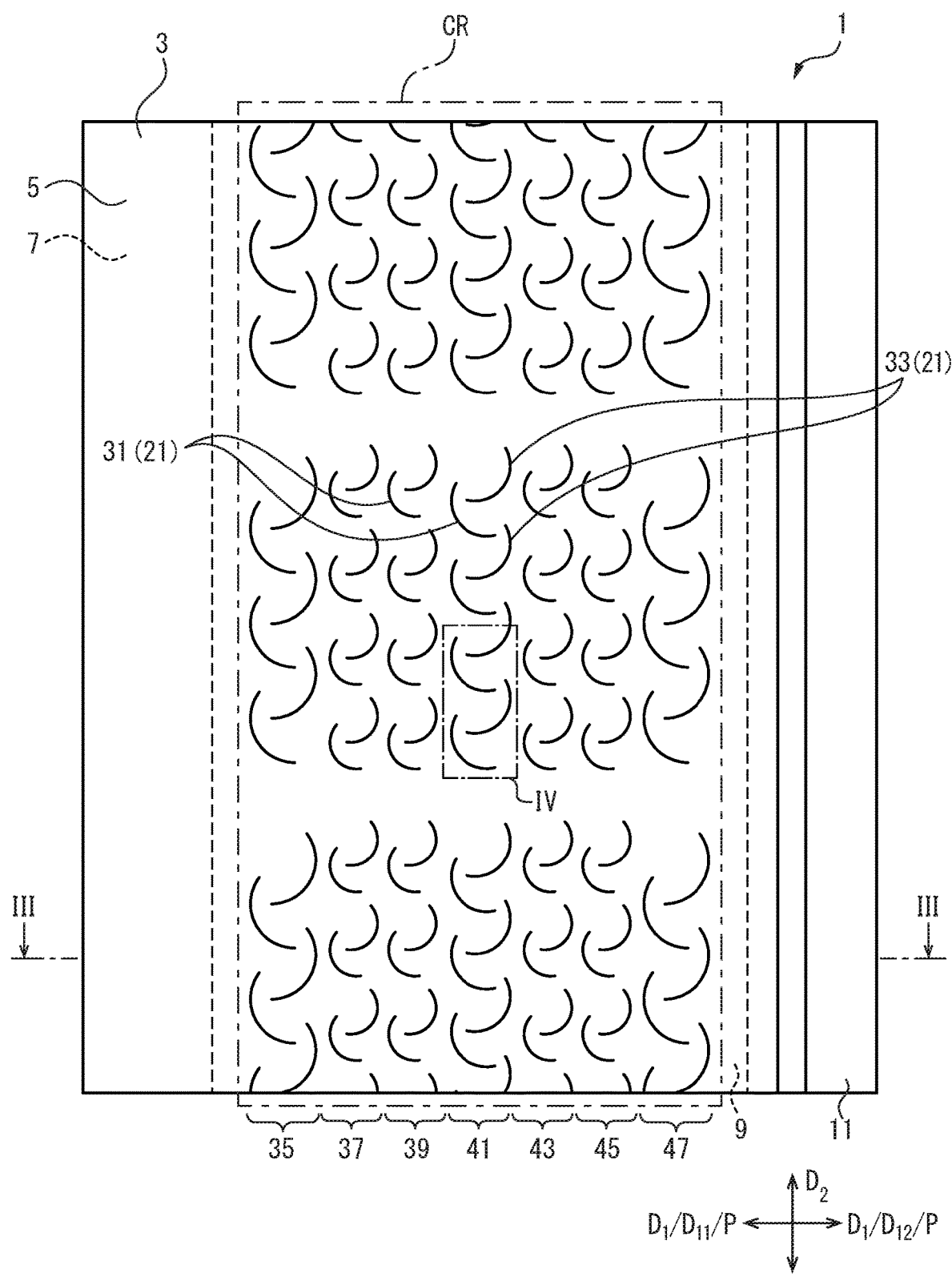
FIG. 1 is a front surface view of a cleaning sheet 1 according to one or more embodiments.
Figure 2:
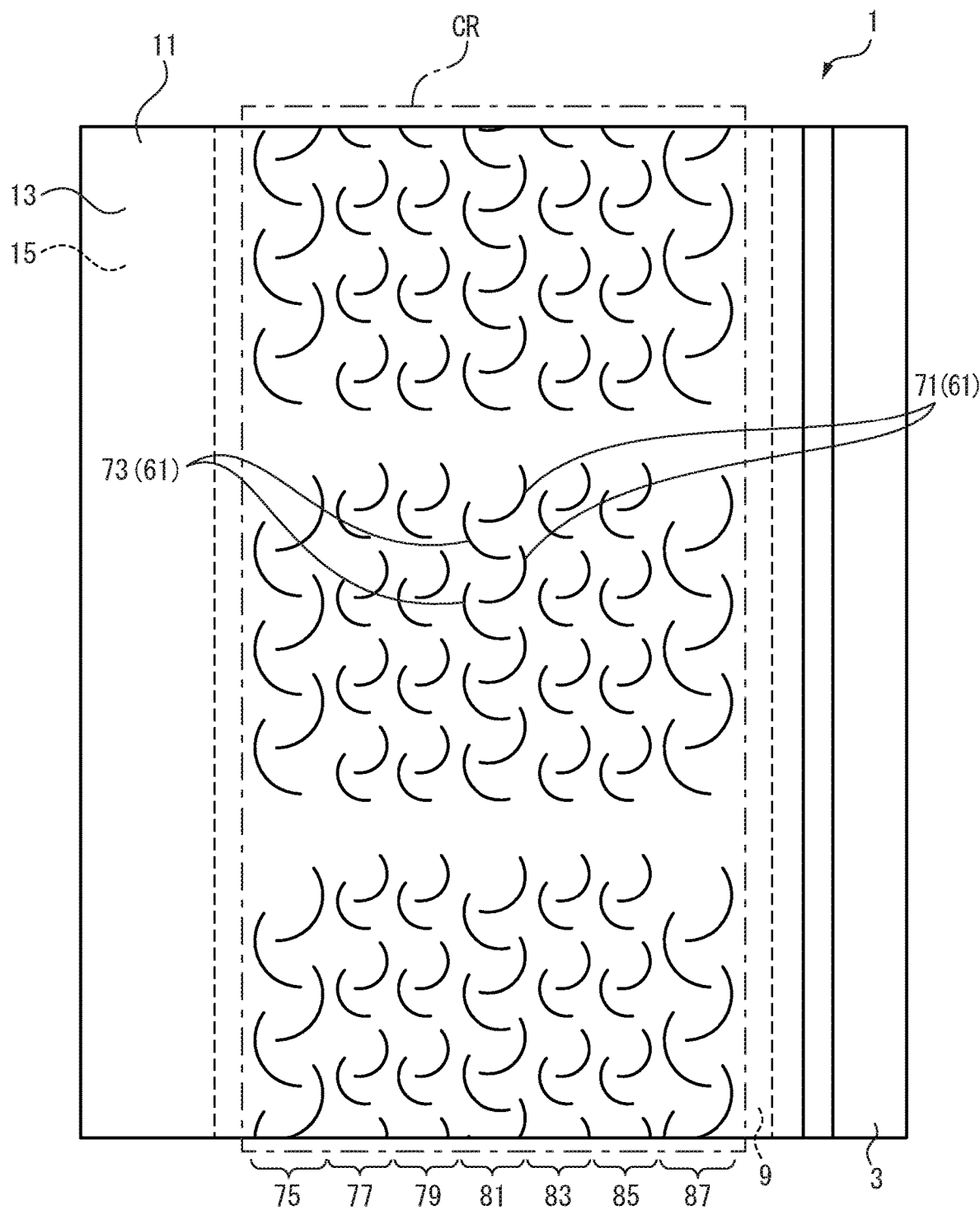
FIG. 2 is a rear surface view of the cleaning sheet 1.
Figure 3:
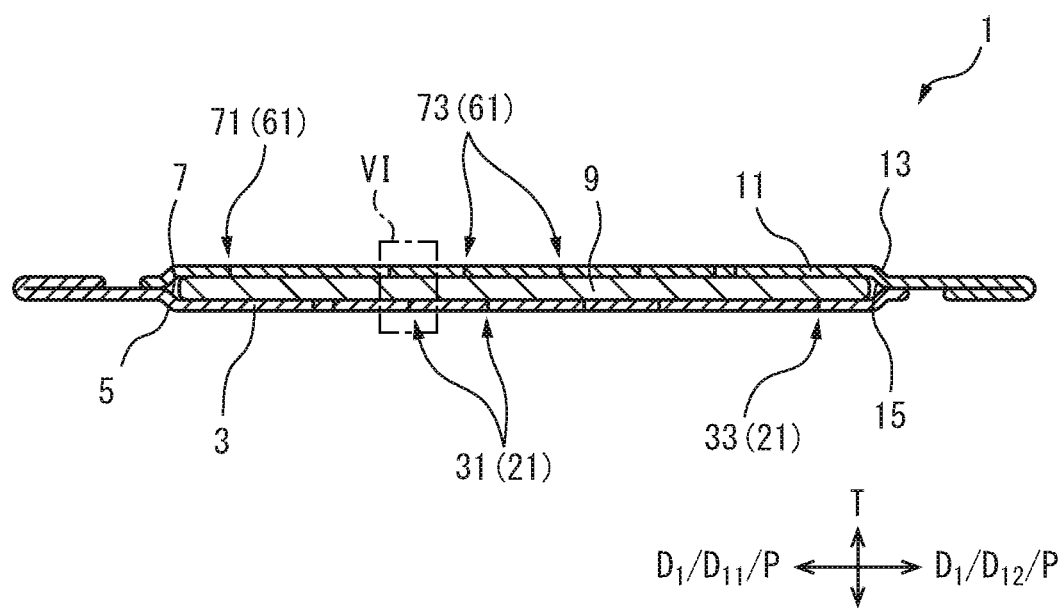
FIG. 3 is an end surface view of the cleaning sheet 1 at a III-III end surface of FIG. 1.
Figure 4:
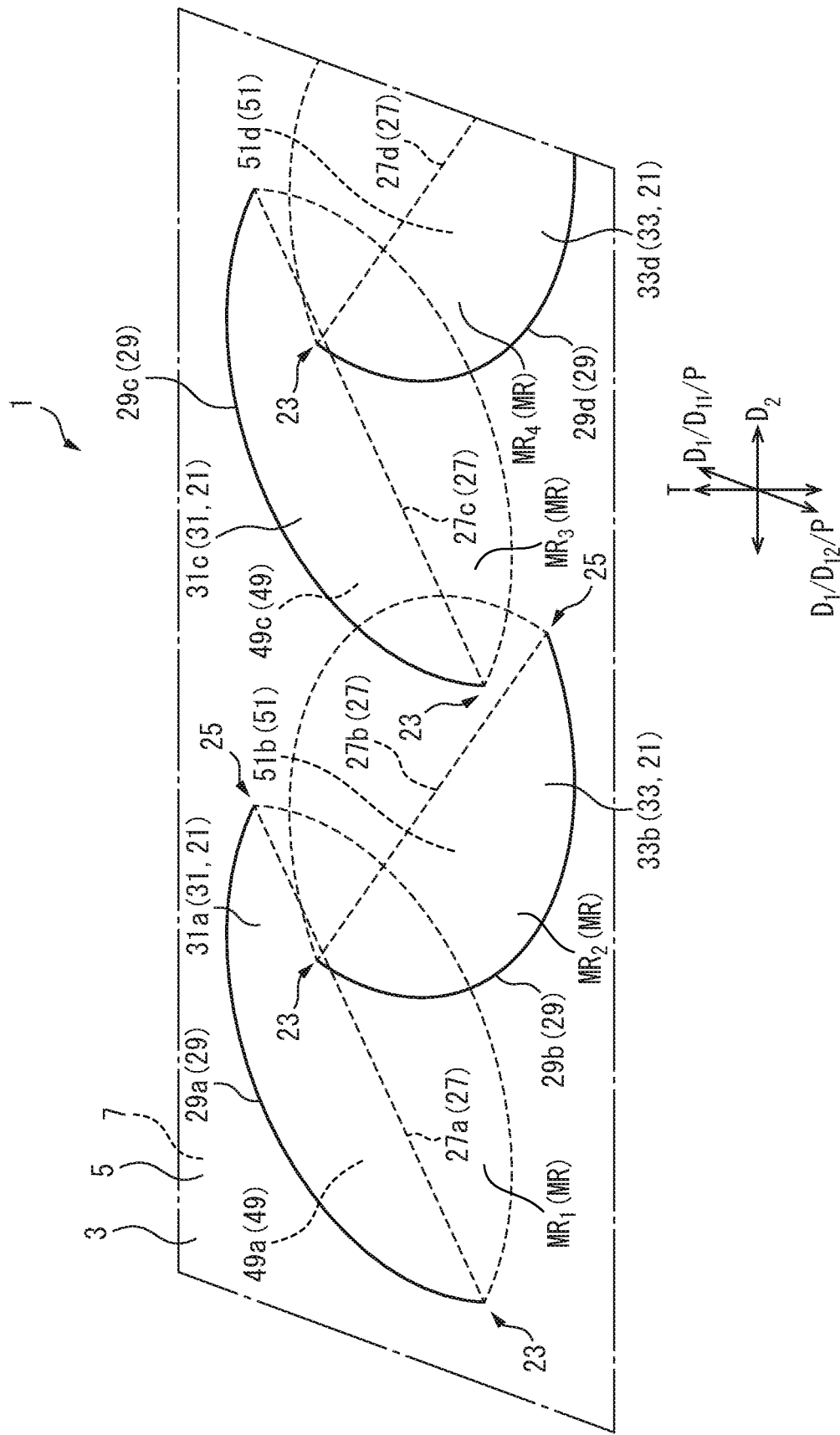
FIG. 4 is an enlarged perspective view of a region IV of FIG. 1.
Figure 5:
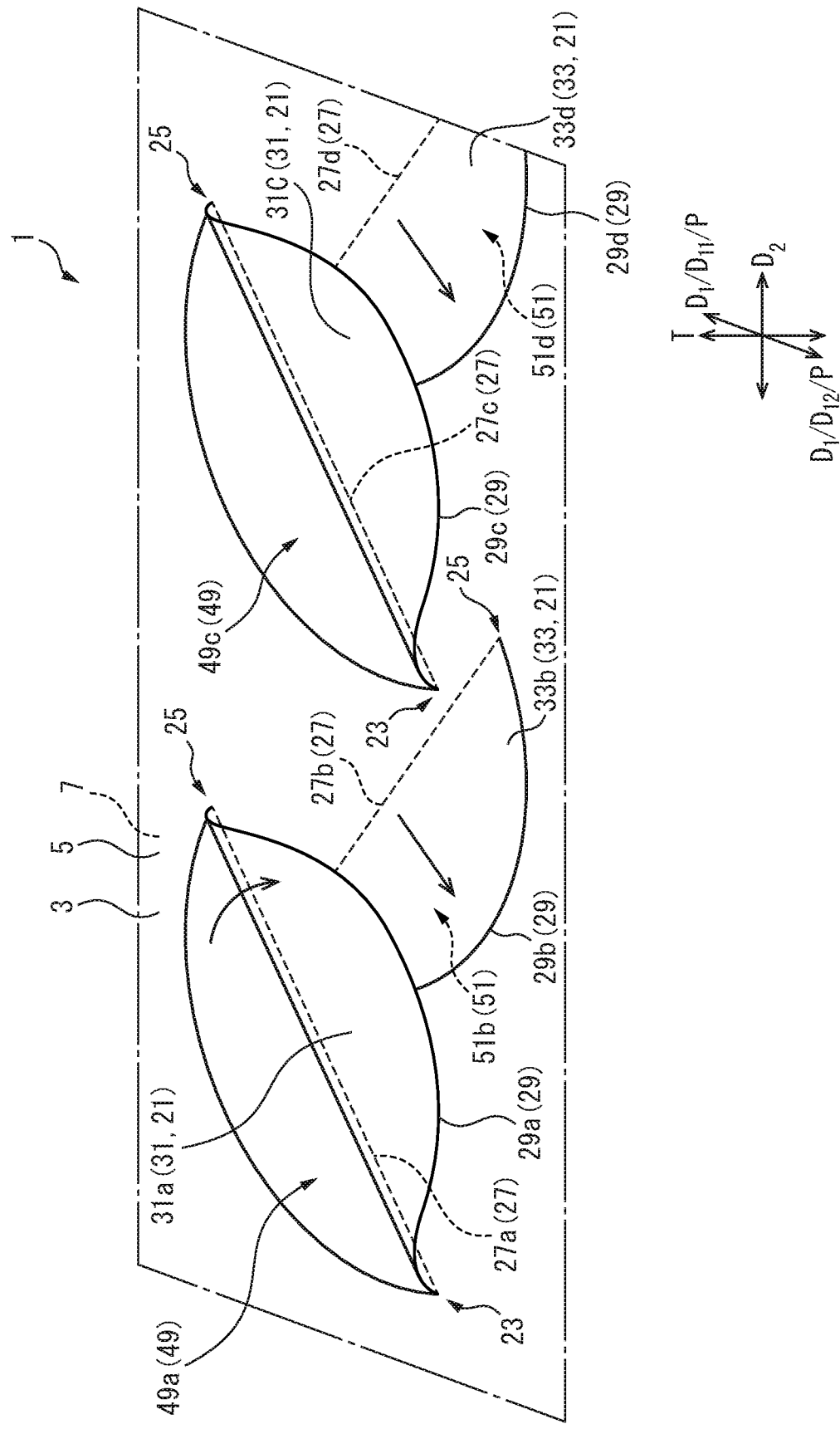
FIG. 5 is a diagram for explaining a reciprocating motion of a first flap portion 21, and corresponds to the enlarged perspective view of the region IV of FIG. 1.
Figure 6:
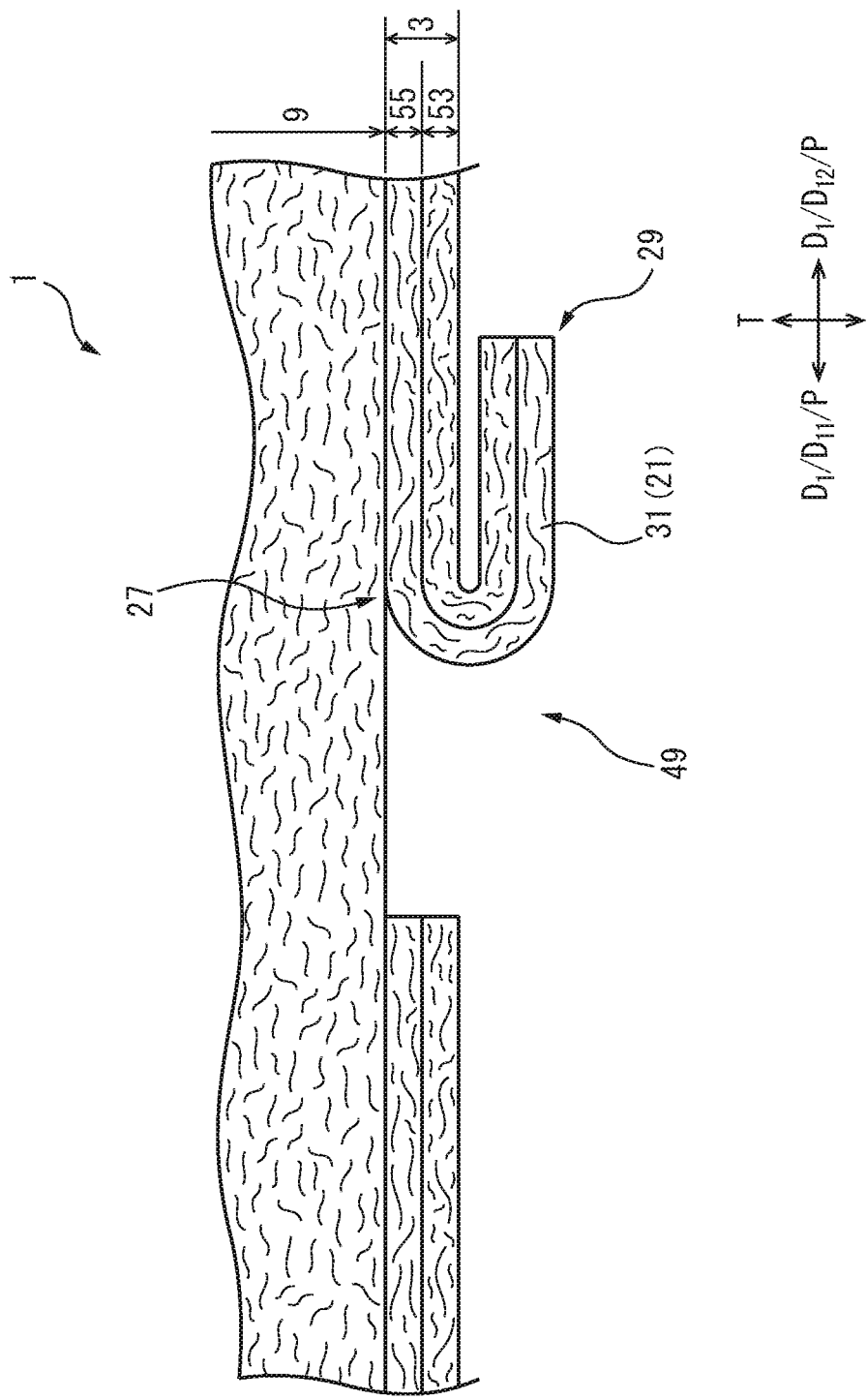
FIG. 6 is an enlarged view of a region VI of FIG. 3.
Figure 7:
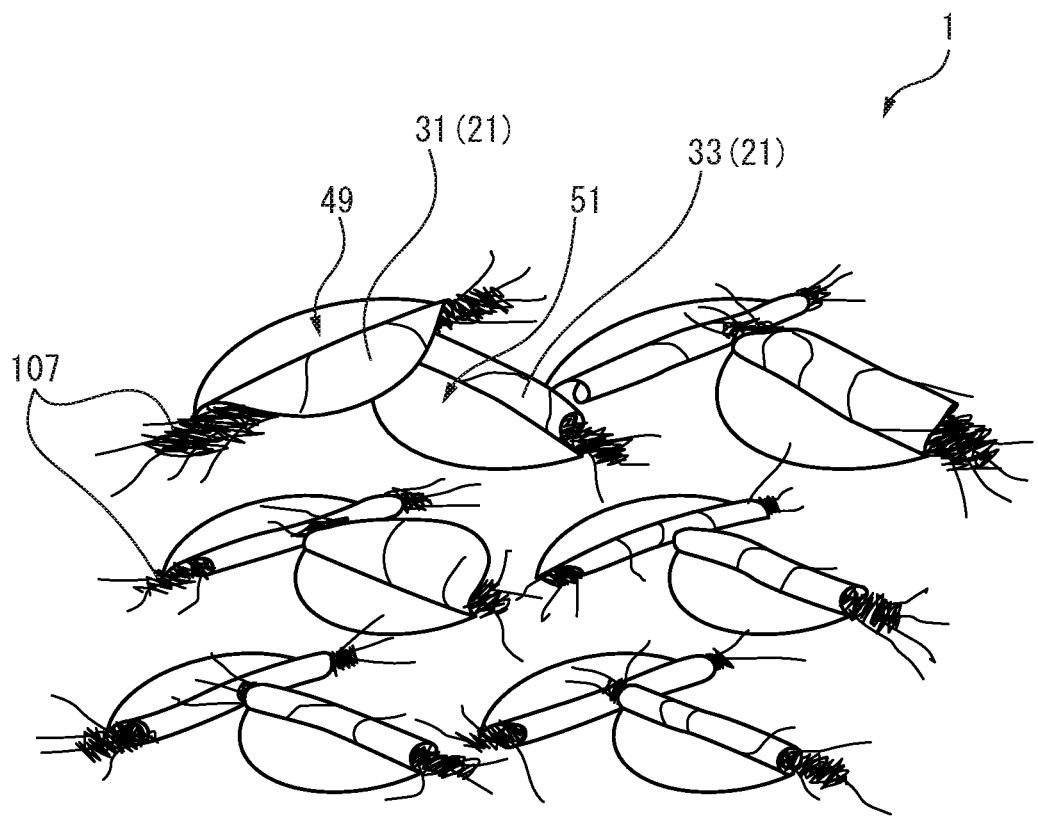
FIG. 7 is a diagram for explaining the cleaning sheet 1 while cleaning a surface to be cleaned.
Figure 8:
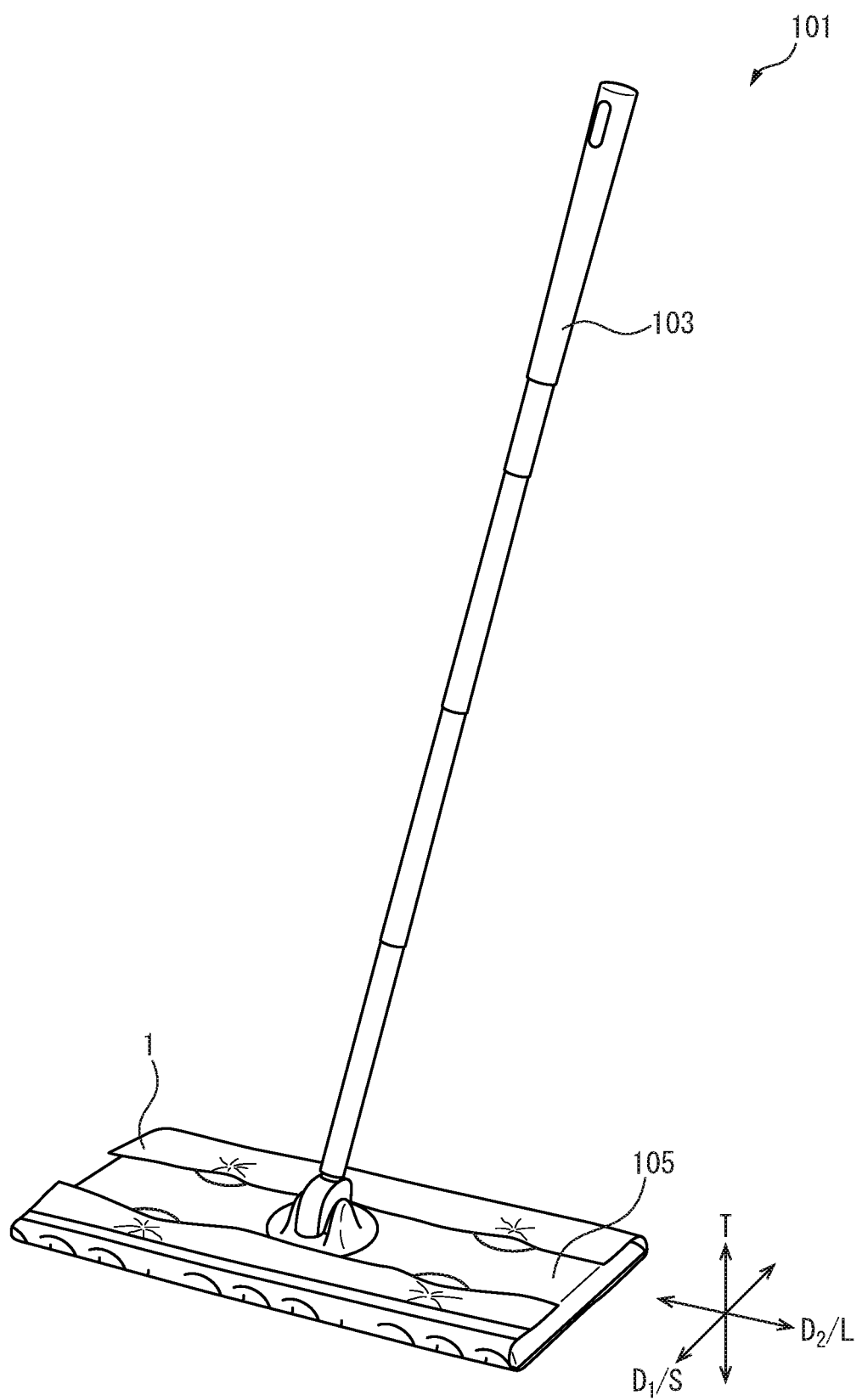
FIG. 8 is a diagram for explaining a state in which the cleaning sheet 1 is attached to the cleaning tool 101.

FIG. 1 to FIG. 8 are views so as to explain the cleaning sheet 1 according to one or more embodiments. FIG. 1 is a front surface view of the cleaning sheet 1. FIG. 2 is a rear surface view of the cleaning sheet 1. FIG. 3 is an end surface view of the cleaning sheet 1 at the III-III end surface of FIG. 1. FIG. 4 is an enlarged perspective view of the region IV of FIG. 1. FIG. 5 is a view so as to explain the reciprocating motion of the first flap portion 21, and corresponds to the enlarged perspective view of the region IV of FIG. 1. FIG. 6 is an enlarged view of the region VI of FIG. 3, and the one direction first flap portion 31 is folded back for the sake of explanation. FIG. 7 is a view so as to explain the cleaning sheet 1 while cleaning the surface to be cleaned. FIG. 8 is a view so as to explain the state in which the cleaning sheet 1 is attached to the cleaning tool 101.

The cleaning sheet 1 according to one or more embodiments includes the plane direction P and the thickness direction T which are orthogonal to each other. The plane direction P includes the first direction $D_1$ and the second direction $D_2$ which are orthogonal to each other, and the first direction $D_1$ is partitioned into the one direction $D_{11}$ and the other direction $D_{12}$.

Incidentally, the first direction $D_1$ and the second direction D match with the short direction and the longitudinal direction of the cleaning sheet 1, respectively, and as shown in FIG. 8, the cleaning sheet 1 is attached to the cleaning tool 101 and is used so that the first direction $D_1$ (short direction) thereof matches with the short direction S of the cleaning sheet attachment portion 105 of the cleaning tool 101, and the second direction $D_2$ (longitudinal direction) thereof matches with the longitudinal direction L of the cleaning sheet attachment portion 105 of the cleaning tool 101.

The cleaning sheet 1 includes the first surface sheet 3 which configures the cleaning surface, the water retention sheet 9 which retains the chemical solution, and the second surface sheet 11 which configures the cleaning surface, in this order, and both surfaces of the first surface sheet 3 and the second surface sheet 11 can be used for cleaning the surface to be cleaned.

The cleaning sheet 1 includes the cleaning region CR which is the region for cleaning the surface to be cleaned.

The first surface sheet 3 is configured by a nonwoven fabric, and includes the first surface 5 which is disposed on the cleaning surface side, and the second surface 7 which is disposed on the opposite side of the first surface 5 and on the water retention sheet 9 side. The second surface 7 is in contact with the water retention sheet 9.

The first surface sheet 3 includes the plurality of first flap portions 21 in the cleaning region CR. Each of the plurality of first flap portions 21 is configured by the first one end 23, the first the other end 25, the first fixed end portion 27 which linearly connects the first one end 23 and the first the other end 25, the first free end portion 29 which protrudes from the first one end 23 and the first the other end 25 as starting points toward the direction away from the first fixed end portion 27.

The plurality of first flap portions 21 are configured by the plurality of one direction first flap portions 31 which protrude in the one direction $D_{11}$ of the first direction, and the plurality of the other direction first flap portions 33 which protrude in the other direction $D_{12}$ of the first direction $D_1$.

The first surface sheet 3 includes 7 rows of the first flap portion groups which extend in the second direction $D_2$ and are disposed apart from each other in the first direction $D_1$, to be specific, the first flap portion first group 35, the first flap portion second group 37, the first flap portion third group 39, the first flap portion fourth group 41, the first flap portion fifth group 43, the first flap portion sixth group 45, and the first flap portion seventh group 47.

In each of the first flap portion first group 35 to the first flap portion seventh group 47, the plurality of the one direction first flap portions 31 and the plurality of the other direction first flap portions 33 are disposed adjacently so as to protrude in the opposite direction.

In the first direction $D_1$, the area of each of the plurality of the first flap portions 21 included in the first flap portion second group 37 to the first flap portion sixth group 45 disposed on the inner side is relatively smaller than the area of each of the plurality of the first flap portions 21 included in the first flap portion first group 35 and the first flap portion seventh group 47 disposed on the outer side.

According to such a configuration, in the first direction $D_1$, when each of the plurality of the first flap portions 21 included in the first flap portion first group 35 and the first flap portion seventh group 47 disposed on the outer side performs a relatively large reciprocating motion, it is easier for the first flap portions 21 to retain the enlarged garbage connected body by involving the garbage connected body, etc. Further, each of the plurality of the first flap portions 21 included in the first flap portion second group 37 to the first flap portion sixth group 45 disposed on the inner side performs a relatively small reciprocating motion, and can catch the garbage left by the plurality of the first flap portions 21 included in the first flap portion first group 35 and the first flap portion seventh group 47 disposed on the outer side.

Further, in each of the first flap portion first group 35 to the first flap portion seventh group 47, the one direction first flap portion 31 which includes the first free end portion 29 that protrudes in the one direction $D_{11}$ of the first direction $D_1$ and the other direction first flap portion 33 which includes the first free end portion 29 that protrudes in the other direction $D_{12}$ of the first direction $D_1$ are alternately disposed in the second direction $D_2$. According to such a configuration, the one direction first flap portion 31 and the other direction first flap portion 33 interfere with each other, whereby the small garbage taking in action, the large garbage entangling action, the garbage connected body retaining action, and the dirt wiping action can be exhibited in a greater degree.

FIG. 4 shows the one direction first flap portion 31 (the first one end 23, the first the other end 25, the first fixed end portion 27, the first free end portion 29, the movable region MR, and the one direction first opening portion 49), to be specific, the one direction first flap portion 31a (the first one end 23, the first the other end 25, the first fixed end portion 27a, the first free end portion 29a, the movable region $MR_1$, and the one direction first opening portion 49a), and the one direction first flap portion 31c (the first one end 23, the first the other end 25, the first fixed end portion 27c, the first free end portion 29c, the movable region $MR_3$, and the one direction first opening portion 49c), and the other direction first flap portion 33 (the first one end 23, the first the other end 25, the first fixed end portion 27, the first free end portion 29, the movable region MR, and the other direction first opening portion 51), to be specific, the other direction first flap portion 33b (the first one end 23, the first the other end 25, the first fixed end portion 27b, the first free end portion 29b, the movable region $MR_2$, and the other direction first opening portion 51b), and the other direction first flap portion 33d (the first one end 23, first the other end (which is not shown), the first fixed end portion 27d, the first free end portion 29d, the movable region $MR_4$, and the other direction first opening portion 51d).

As shown in FIG. 4, in the two adjacent first flap portions, that is, in the one direction first flap portion 31 and the other direction first flap portion 33, the movable regions MR thereof overlap with each other in the thickness direction T. To be specific, the movable region $MR_1$ of the one direction first flap portion 31a and the movable region $MR_2$ of the other direction first flap portion 33b overlap with each other in the thickness direction T, the movable region $MR_2$ of the other direction first flap portion 33b and the movable region $MR_3$ of the one direction first flap portion 31c overlap with each other in the thickness direction T, and the movable region $MR_3$ of the one direction first flap portion 31c and the movable region $MR_4$ of the other direction first flap portion 33d overlap with each other in the thickness direction T.

According to such a configuration, by the one direction first flap portion 31 and the other direction first flap portion 33 interfering with each other, the same can move in a complicated manner, and the small garbage taking in action, the large garbage entangling action, the garbage connected body retaining action, and the dirt wiping action can be exhibited in a greater degree.

Further, as shown in FIG. 4, the two adjacent first flap portions, that is, the one direction first flap portion 31 itself and the other direction first flap portion 33 itself overlap with each other in the thickness direction T. To be specific, the one direction first flap portion 31a itself and the other direction first flap portion 33b itself overlap with each other in the thickness direction T, the other direction first flap portion 33b itself and the one direction first flap portion 31c itself overlap with each other in the thickness direction T, and the one direction first flap portion 31c itself and the other direction first flap portion 33d itself overlap with each other in the thickness direction T.

According to such a configuration, by the one direction first flap portion 31 and the other direction first flap portion 33 interfering with each other, the same can move in a complicated manner, and the small garbage taking in action, the large garbage entangling action, the garbage connected body retaining action, and the dirt wiping action can be exhibited in a greater degree.

Further, as shown in FIG. 4, the first free end portion 29a of the one direction first flap portion 31a does not cross with the first free end portion 29b of the adjacent the other direction first flap portion 33b, and the first fixed end portion 27a of the one direction first flap portion 31a crosses with the first fixed end portion 27b of the adjacent the other direction first flap portion 33b.

Further, the first free end portion 29c of the one direction first flap portion 31 does not cross with the first free end portion 29d of the adjacent the other direction first flap portion 33d, and the first fixed end portion 27c of the one direction first flap portion 31c crosses with the first fixed end portion 27d of the adjacent the other direction first flap portion 33d.

According to such a configuration, by the one direction first flap portion 31a and the other direction first flap portion 33b interfering with each other, while retaining the degree of freedom of the first free end portion 29a and the first free end portion 29b which are to be the starting points when performing the reciprocating motion, the same can move in a complicated manner, and the small garbage taking in action, the large garbage entangling action, the garbage connected body retaining action, and the dirt wiping action can be exhibited in a greater degree. Further, by the one direction first flap portion 31c and the other direction first flap portion 33d interfering with each other, while retaining the degree of freedom of the first free end portion 29c and the first free end portion 29d which are to be the starting points when performing the reciprocating motion, the same can move in a complicated manner, and the small garbage taking in action, the large garbage entangling action, the garbage connected body retaining action, and the dirt wiping action can be exhibited in a greater degree.

In FIG. 4, the relationship between the one direction first flap portion 31 and the other direction first flap portion 33 which configure the first flap portion fourth group 41 is explained, however, the one direction first flap portion 31 and the other direction first flap portion 33 in each of the first flap portion first group 35 to the first flap portion seventh group 47 have the similar relationships.

As shown in FIG. 5, when the cleaning sheet 1 is moved in the one direction $D_{11}$ of the first direction $D_1$, the one direction first flap portion 31 (the one direction first flap portion 31a and the one direction first flap portion 31c) is folded toward the other direction $D_{12}$ of the first direction $D_1$. At this time, in a case in which the other direction first flap portion 33 (the other direction first flap portion 33b and the other direction first flap portion 33d) has been folded in the one direction $D_{11}$ of the first direction $D_1$, in accordance with the one direction first flap portion 31 (the one direction first flap portion 31a and the one direction first flap portion 31c) being folded, the other direction first flap portion 33 (the other direction first flap portion 33b and the other direction first flap portion 33d) collapses toward the other direction $D_{12}$ of the first direction $D_1$, and it becomes easier to return to the original position.

Incidentally, by the one direction first flap portion 31 (the one direction first flap portion 31a and the one direction first flap portion 31c) being folded in the other direction $D_{12}$ of the first direction $D_1$, the one direction first opening portion 49 (the one direction first opening portion 49a and the one direction first opening portion 49c) is formed at the position where the one direction first flap portion 31 (the one direction first flap portion 31a and the one direction first flap portion 31c) was present, and by the other direction first flap portion 33 (the other direction first flap portion 33b and the other direction first flap portion 33d) being folded in the one direction $D_{11}$ of the first direction $D_1$, the other direction first opening portion 51 (the other direction first opening portion 51b and the other direction first opening portion 51d) is formed at the position where the other direction first flap portion 33 (the other direction first flap portion 33b and the other direction first flap portion 33d) was present.

Incidentally, since there is a tendency that the above-mentioned small garbage taking in action of the one direction first opening portion 49 which is formed by the one direction first flap portion 31 being folded, is to be the greatest at the vicinity of the first fixed end portion 27 which is the folding starting point of the one direction first flap portion 31, in a case in which the cleaning sheet 1 is moved in the one direction $D_{11}$ of the first direction $D_1$, there is a tendency that the above-mentioned small garbage taking in action of the one direction first opening portion 49a and the one direction first opening portion 49c is to be greater. Further, since there is a tendency that the above-mentioned small garbage taking in action of the other direction first opening portion 51 which is formed by the other direction first flap portion 33 being folded, is to be the greatest at the vicinity of the first fixed end portion 27 which is the folding starting point of the other direction first flap portion 33, in a case in which the cleaning sheet 1 is moved in the other direction $D_{12}$ of the first direction $D_1$, there is a tendency that the above-mentioned small garbage taking in action of the other direction first opening portion 51b and the other direction first opening portion 51d is to be greater.

Although not shown, when the cleaning sheet 1 is moved in the other direction $D_{12}$ of the first direction $D_1$, the other direction first flap portion 33 (the other direction first flap portion 33b and the other direction first flap portion 33d) is folded back toward the one direction $D_{11}$ of the first direction $D_1$. In accordance therewith, the one direction first flap portion 31 (the one direction first flap portion 31a and the one direction first flap portion 31c) collapses toward the one direction $D_{11}$ of the first direction $D_1$, and it becomes easier to return to the original position.

As shown in FIG. 6, the first surface sheet 3 includes the first surface sheet first layer 53 which configures the first surface 5 and includes hydrophilic fibers and hydrophobic fibers, and the first surface sheet second layer 55 which configures the second surface 7 and includes hydrophilic fibers and hydrophobic fibers, and the ratio of the hydrophobic fibers in the first surface sheet second layer 55 is higher than the ratio of the hydrophobic fibers in the first surface sheet first layer 53. According to such a configuration, the first surface sheet first layer 53 can expand the chemical solution to the surface to be cleaned, can clean the surface to be cleaned, and in a case in which the surface to be cleaned includes a portion with a high friction where garbage, dirt, etc., are present, the first flap portion 21 is folded back, and the first surface sheet second layer 55 which includes the hydrophobic fibers with a high ratio comes into contact with the wet dirt portion, whereby can scrape the dirt portion and remove the same. Further, since it becomes difficult for the first surface sheet second layer 55 with the high hydrophobic fiber ratio to be adhered to the water retention sheet 9, it becomes easier for the plurality of the one direction first flap portions 31 (and the plurality of the other direction first flap portions) to be folded back when the cleaning sheet 1 is used.

The second surface sheet 11 has the similar configuration as the first surface sheet 3. That is, the second surface sheet 11 is configured by a nonwoven fabric, and includes the first surface 13 which is disposed on the cleaning surface side, and the second surface 15 which is disposed on the opposite side of the first surface 13 and on the water retention sheet 9 side. The second surface 15 is in contact with the water retention sheet 9.

The second surface sheet 11 includes the plurality of second flap portions 61 in the cleaning region CR. Each of the plurality of the second flap portions 61 includes the second one end (which is not shown), the second the other end (which is not shown), the second fixed end portion (which is not shown) which connects the second one end and the second the other end, and the second free end portion (which is not shown) which protrudes from the second one end and the second the other end as starting points toward the direction away from the second fixed end portion (which is not shown).

Further, the second surface sheet 11 is configured by the plurality of the one direction second flap portions 71 which include the second free end portion (which is not shown) that protrudes in the one direction $D_{11}$ of the first direction $D_1$ the one direction $D_{ii}$, the plurality of the other direction second flap portions 73 which include the second free end portion (which is not shown) that protrudes in the other direction $D_{12}$ of the first direction $D_1$.

The second one end, the second the other end, the second fixed end portion, the second free end portion, the one direction second flap portion, and the other direction second flap portion in the second surface sheet 11 are similar to the first one end 23, the first the other end 25, the first fixed end portion 27, the first free end portion 29, the other direction first flap portion 33, and the one direction first flap portion 31, respectively, whereby the explanations thereof are omitted.

Further, the second surface sheet 11 includes the second flap portion first group 75 to the second flap portion seventh group 87, which are similar to the first flap portion first group 35 to the first flap portion seventh group 47, whereby the explanations thereof are omitted.

As shown in FIG. 8, when the cleaning sheet 1 is attached to the cleaning sheet attachment portion 105 of the cleaning tool 101 which includes the holding portion 103 and the cleaning sheet attachment portion 105 so that the first surface sheet 3 comes into contact with the surface to be cleaned, and the surface to be cleaned is cleaned, as shown in FIG. 7, each of the plurality of the one direction first flap portions 31 and the plurality of the other direction first flap portions 33 retain the garbage connected body 107 by involving the same, and small garbage (which is not shown) is collected through each of the plurality of the one direction first opening portions 49 and each of the plurality of the other direction first opening portions 51, and the small garbage (which is not shown) is retained between the first surface sheet 3 and the water retention sheet 9.

The cleaning sheet according to one or more embodiments is not particularly limited as long as the cleaning sheet includes the surface sheet and the water retention sheet which retains a chemical solution. The cleaning sheet according to one or more embodiments may for example be configured by two sheets of surface sheets and the water retention sheet which is disposed between such sheets in the same manner as the above embodiments, and both surfaces of the cleaning sheet may be used for cleaning the surface to be cleaned, or may be configured by a surface sheet, a liquid impermeable sheet such as a film, etc., and a water retention sheet which is disposed therebetween. Further, the cleaning sheet according to one or more embodiments may include a plurality of sheets of surface sheets (for example, a plurality of sheets of surface sheets with different shapes of the plurality of flap portions) and a water retention sheet which is disposed at one of the plurality of sheets of surface sheets.

Further, the cleaning sheet according to one or more embodiments may include an additional sheet, for example, a mesh sheet, between the surface sheet and the water retention sheet. Incidentally, from the viewpoint of directly applying the chemical solution which the water retention sheet retains to garbage, dirt, etc., which are present on the surface to be cleaned, the surface sheet and the water retention sheet may be adjacent to each other in the thickness direction of the cleaning sheet.

In the cleaning sheet according to one or more embodiments, the nonwoven fabric which configures the surface sheet is not particularly limited as long as the same includes the first surface on the cleaning surface side and the second surface on the water retention sheet side, and those which are used as a surface sheet in the technical field may be mentioned, and for example, a spunlace nonwoven fabric, an air through nonwoven fabric, a spunbond nonwoven fabric, an SMS nonwoven fabric, a thermal bond nonwoven fabric, a point bond nonwoven fabric, a melt blown nonwoven fabric, a chemical bond nonwoven fabric, an airlaid nonwoven fabric, etc., may be mentioned.

The above-mentioned nonwoven fabric includes a hydrophilic fiber and a hydrophobic fiber, and includes the hydrophilic fiber and the hydrophobic fiber with the ratio of more 5 to 45 mass % and 55 to 95 mass %, 20 to 30 mass % and 70 to 80 mass %, or 23 to 28 mass % and 72 to 77 mass %. Accordingly, while the surface sheet supplies the chemical solution which the water retention sheet retains to the surface to be cleaned through the surface sheet, it becomes easier to scrape the solid dirt which is present on the surface to be cleaned, and to collect garbage, etc.

Incidentally, in a case in which the above-mentioned nonwoven fabric is configured by multiple layers of two layers or three layers or more as described later, the above-mentioned ratio of the hydrophilic fiber and the hydrophobic fiber means the ratio as the entire nonwoven fabric.

In the cleaning sheet according to one or more embodiments, the above-mentioned surface sheet may be configured by a single layer or may be configured by multiple layers.

In a case in which the above-mentioned surface sheet is configured by multiple layers of two layers or three layers or more, each of the first layer which configures the first surface and the second layer which configures the second surface may include the hydrophilic fiber and the hydrophobic fiber, and the ratio of the hydrophobic fiber which configures the second layer may be higher than the ratio of the hydrophobic fiber which configures the first layer, may be higher than the same by 1.00 to 2.00 times, may be higher than the same by 1.05 to 1.50 times, and may be higher than the same by 1.10 to 1.20 times. Accordingly, the first layer is to have a relatively higher ability to expand the chemical solution which the water retention sheet retains in the surface to be cleaned, and the second layer is to have a relatively superior scraping property of the dirt portion.

As the above-mentioned hydrophilic fiber, cellulose based fibers, for example, pulp fibers, regenerated cellulose fibers, and semi-synthetic cellulose fibers may be mentioned. As the above-mentioned regenerated cellulose fibers, rayon fibers, for example, viscose rayon obtained from viscose, polynosic and modal, copper ammonia rayon fibers obtained from a copper ammonium salt solution of cellulose (also referred to as "cupra"); lyocell and tencel, etc., obtained by an organic solvent spinning method using an organic solvent which is a mixed solution of an organic compound and water, without through a cellulose derivative, etc., may be mentioned.

As the above-mentioned semi-synthetic cellulose fibers, for example, acetate fibers such as triacetate fibers and diacetate fibers, may be mentioned.

As the above-mentioned hydrophobic fiber, synthetic fibers, for example, fibers formed by heat-fusible fibers, such as polyolefin-based polymers, such as polyethylene or polypropylene; polyester-based polymers, such as terephthalate-based polymers, such as polyethylene terephthalate (PET), polybutylene terephthalate, polypentylene terephthalate; polyamide-based polymers, such as nylon 6 or nylon 6,6; acrylic polymers; polyacrylonitrile-based polymers; variables of the above-mentioned or combinations of the above-mentioned, etc., may be mentioned.

In the cleaning sheet according to one or more embodiments, the water retention sheet is not particularly limited as long as the same can retain a chemical solution, those which are used as a water retention sheet in the technical field can be adopted without particularly being limited, and may be configured by for example, an airlaid pulp, a spunlace nonwoven fabric, a pulp sheet, a sheet-like sponge, etc.

The above-mentioned water retention sheet may include a hydrophilic fiber so as to retain a chemical solution. As the above-mentioned hydrophilic fiber, those similar to the ones explained at the section of the surface sheet may be mentioned. For example, the above-mentioned airlaid pulp may include the synthetic fibers explained at the section of the surface sheet and a hydrophilic fiber (for example, pulp fibers).

In the cleaning sheet according to one or more embodiments, as the chemical solution which the water retention sheet retains, a chemical solution known in the technical field may be adopted.

In the cleaning sheet according to one or more embodiments, the surface sheet includes a plurality of flap portions in the cleaning region. Each of the plurality of flap portions is not particularly limited as long as the same includes one end, the other end, a linear fixed end portion which connects the one end and the other end, and a free end portion which protrudes from the one end and the other end as starting points toward a direction away from the fixed end portion, and may take any shape.

In each of the above-mentioned plurality of flap portions, the free end portion may be selected from a group of a curved portion (for example, a circular arc portion, and an elliptical arc portion), two or more linear portions, and a combination of the curved portion and the linear portion.

Further, in the above-mentioned flap portion, the farthest portion of the free end portion which is the farthest from the fixed end portion may be configured by a curved portion or a linear portion which extends in a direction parallel to or crossing with the fixed end portion.

The above-mentioned curved portion has a curvature radius of 3.0 to 25.0 mm, 5.0 to 20.0 mm, or 7.0 to 15.0 mm. The above-mentioned linear portion has a crossing angle with the fixed end portion of 5.0 to 30.0°, 10.0 to 25.0°, or 15.0 to 20.0°. Accordingly, when the cleaning sheet according to one or more embodiments is used, it is easier for the flap portion to perform the reciprocating motion.

Figure 10A:
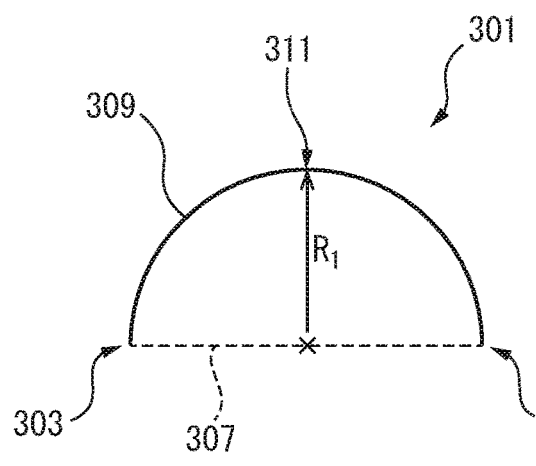
FIGS. 10A-10D are diagrams for explaining examples of the flap portion in the cleaning sheet according to one or more embodiments.

FIGS. 10A-10D are a view for explaining the examples of the flap portion in the cleaning sheet according to one or more embodiments. The flap portion 301 shown in FIG. 10A is configured by the one end 303, the other end 305, the fixed end portion 307 which linearly connects the one end 303 and the other end 305, and the free end portion 309 curved in a protruded manner which protrudes from the one end 303 and the other end 305 as starting points toward the direction away from the fixed end portion 307, and the free end portion 309 is the semi-circular arc portion with the curvature radius $R_1$, and the farthest portion 311 also has the curvature radius $R_1$.

Figure 10B:
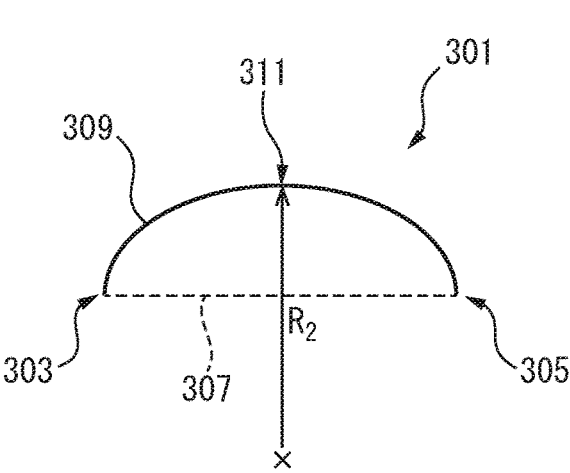

The flap portion 301 shown in FIG. 10B is configured by the one end 303, the other end 305, the fixed end portion 307 which linearly connects the one end 303 and the other end 305, and the free end portion 309 curved in a protruded manner which protrudes from the one end 303 and the other end 305 as starting points toward the direction away from the fixed end portion 307, and the free end portion 309 is the elliptical arc portion, and the farthest portion 311 has the curvature radius $R_2$.

Figure 10C:
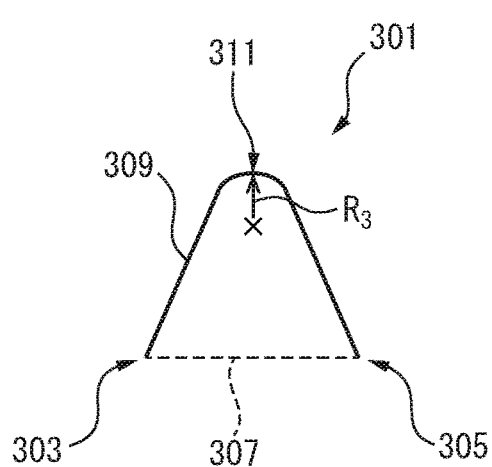

The flap portion 301 shown in FIG. 10C is configured by the one end 303, the other end 305, the fixed end portion 307 which linearly connects the one end 303 and the other end 305, and the free end portion 309 which is configured by two linear portions and the elliptical arc portion therebetween, and the farthest portion 311 has the curvature radius $R_3$.

Figure 10D:
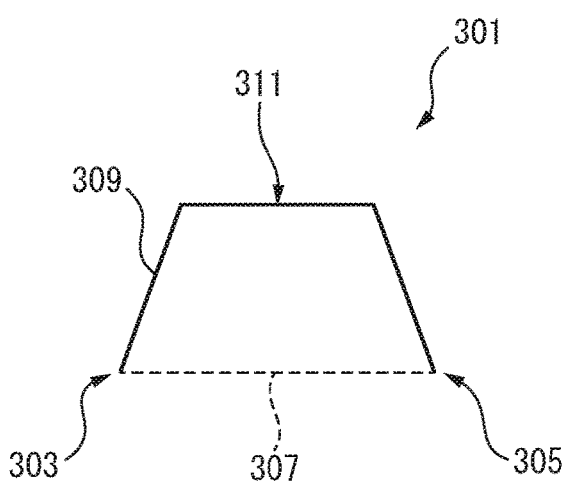

The flap portion 301 shown in FIG. 10D is configured by the one end 303, the other end 305, the fixed end portion 307 which linearly connects the one end 303 and the other end 305, and the free end portion 309 which is configured by three linear portions, and the farthest portion 311 is configured by a linear portion which has a crossing angle with the fixed end portion 307 of 0°. Incidentally, the flap portion 201 which is shown in FIG. 9 also corresponds to the flap portion in the cleaning sheet according to one or more embodiments.

In the cleaning sheet according to one or more embodiments, the surface sheet can include a plurality of flap portions with any size, and the surface sheet includes as the plurality of flap portions, in the first direction and/or the second direction, a flap portion which is disposed on the inner side with a relatively small area, and a flap portion which is disposed on the outer side with a relatively large area. According to such a configuration, when the flap portion which is disposed on the outer side with a relatively large area performs a relatively large reciprocating motion, it is easier for the flap portion to retain the enlarged garbage connected body by involving the garbage connected body, etc. Further, the flap portion which is disposed on the inner side with a relatively small area performs a relatively small reciprocating motion, and can catch the garbage left by the flap portion which is disposed on the outer side with a large area.

In the cleaning sheet according to one or more embodiments, the surface sheet includes, as the plurality of flap portions, those in which the movable regions of the two adjacent flap portions overlapping with each other in the thickness direction of the cleaning sheet. According to such a configuration, the cleaning sheet according to one or more embodiments can exhibit the above-mentioned small garbage taking in action, the large garbage entangling action, the garbage connected body retaining action, and the dirt wiping action in a greater degree.

In the cleaning sheet according to one or more embodiments, the surface sheet includes, as the plurality of flap portions, those in which the two adjacent flap portions overlapping with each other in the thickness direction of the cleaning sheet. According to such a configuration, the cleaning sheet according to one or more embodiments can exhibit the above-mentioned small garbage taking in action, the large garbage entangling action, the garbage connected body retaining action, and the dirt wiping action in a greater degree.

In the cleaning sheet according to one or more embodiments, the surface sheet includes, as the plurality of flap portions, two adjacent flap portions in which a free end portion of one flap portion crosses with a fixed end portion of the other flap portion, and does not cross with a free end portion of the other flap portion. According to such a configuration, the cleaning sheet according to one or more embodiments can exhibit the above-mentioned small garbage taking in action, the large garbage entangling action, the garbage connected body retaining action, and the dirt wiping action in a greater degree.

In the cleaning sheet according to one or more embodiments, the surface sheet includes, as the plurality of flap portions, one direction flap portion which includes a free end portion which protrudes toward one direction of a first direction, and the other direction flap portion which includes a free end portion which protrudes toward the other direction of the first direction. According to such a configuration, when the cleaning sheet according to one or more embodiments is made to reciprocate in the first direction, the above-mentioned small garbage taking in action, the large garbage entangling action, the garbage connected body retaining action, and the dirt wiping action can be exhibited when moved in either direction.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 cleaning sheet
3 first surface sheet
5 first surface
7 second surface
9 water retention sheet
11 second surface sheet
13 first surface
15 second surface
21 first flap portion
23 first one end
25 first the other end
27 first fixed end portion
29 first free end portion
31 one direction first flap portion
33 the other direction first flap portion
35 first flap portion first group
37 first flap portion second group
39 first flap portion third group
41 first flap portion fourth group
43 first flap portion fifth group
45 first flap portion sixth group
47 first flap portion seventh group
49 one direction first opening portion
51 the other direction first opening portion
53 first surface sheet first layer
55 first surface sheet second layer
CR cleaning region
P plane direction
$D_1$ first direction
$D_{11}$ one direction
$D_{12}$ the other direction
$D_2$ second direction
T thickness direction
MR movable region
L longitudinal direction
S short direction

What is claimed is:

1. A cleaning sheet having a first direction, a second direction, and a thickness direction that are orthogonal to each other, the cleaning sheet comprising:
    a water retention sheet that retains a chemical solution;
    a surface sheet that is a nonwoven fabric and comprises:
        a first surface on a side of a surface to be cleaned; and
        a second surface on a side of the water retention sheet; and
    a cleaning region, wherein
    the surface sheet comprises, in the cleaning region, a plurality of flap portions,
    each of the plurality of flap portions comprises:
        one end;
        another end;
        a fixed end portion that connects the one end and the another end; and
        a free end portion that protrudes from the one end and the another end as starting points toward a direction away from the fixed end portion,
    each of the plurality of flap portions is configured to be folded back so as to leave an opening portion on the surface sheet,
    the plurality of folded-back flap portions are configured to retain a garbage connected body, and
    the surface sheet and the water retention sheet are configured to retain garbage, collected through the opening portion, between the surface sheet and the water retention sheet.

2. The cleaning sheet according to claim 1, wherein the plurality of flap portions comprises, in at least one of the first direction or the second direction:
    a first flap portion disposed on an inner side and having a first area; and
    a second flap portion disposed on an outer side and having a second area that is larger than the first area.

3. The cleaning sheet according to claim 1, wherein
    each of the plurality of flap portions comprises, when folded back at any position, a movable region that is a maximum region in which each of the plurality of flap portions can be present, and the plurality of flap portions comprises flap portions in which the movable regions of two adjacent flap portions that overlap with each other in the thickness direction.

4. The cleaning sheet according to claim 1, wherein the plurality of flap portions comprises two adjacent flap portions that overlap with each other in the thickness direction.

5. The cleaning sheet according to claim 1, wherein the plurality of flap portions comprises two adjacent flap portions in which the free end portions do not cross with each other and the fixed end portions cross with each other.

6. The cleaning sheet according to claim 1, wherein the plurality of flap portions comprises:

one direction flap portion that comprises a free end portion that protrudes toward one direction of the first direction; and another direction flap portion that comprises a free end portion that protrudes toward another direction of the first direction.

7. The cleaning sheet according to claim 1, wherein the surface sheet comprises:

a first layer that is the first surface and comprises a hydrophilic fiber and a hydrophobic fiber; and a second layer that is the second surface and comprises a hydrophilic fiber and a hydrophobic fiber, and a ratio of the hydrophobic fiber of the second layer is higher than a ratio of the hydrophobic fiber of the first layer.

8. A surface sheet for a cleaning sheet having a first direction, a second direction, and a thickness direction that are orthogonal to each other, wherein the cleaning sheet comprises:

the surface sheet that is a cleaning surface;

a water retention sheet that retains a chemical solution; and a cleaning region, the surface sheet is a nonwoven fabric and comprises a first surface which configures the cleaning surface; and a second surface on an opposite side of the first surface, the surface sheet comprises, in the cleaning region, a plurality of flap portions, each of the plurality of flap portions comprises:

one end;

another end;

a fixed end portion that connects the one end and the another end; and a free end portion that protrudes from the one end and the another end as starting points toward a direction away from the fixed end portion, each of the plurality of flap portions is configured to be folded back so as to leave an opening portion on the surface sheet, the plurality of folded-back flap portions are configured to retain a garbage connected body, and the surface sheet and the water retention sheet are configured to retain garbage, collected through the opening portion, between the surface sheet and the water retention sheet.

* * * * *